United States Patent [19]

Clem

[11] 4,209,568
[45] Jun. 24, 1980

[54] BENTONITE-GELLED OIL WATERPROOFING COMPOSITION

[75] Inventor: Arthur G. Clem, Des Plaines, Ill.

[73] Assignee: American Colloid Company, Skokie, Ill.

[21] Appl. No.: 942,935

[22] Filed: Sep. 18, 1978

[51] Int. Cl.$^2$ .................... E02D 27/40; C09K 3/12; B32B 29/06

[52] U.S. Cl. .................... 428/454; 52/169.14; 106/33; 106/67; 285/DIG. 26; 405/107; 405/116; 405/263; 405/270; 428/484; 428/485; 428/497; 428/498; 428/538; 428/911

[58] Field of Search .................... 106/67, 68, 33; 405/229, 263, 264, 107, 110, 115, 116, 270; 52/169.14; 285/DIG. 26; 428/538, 539, 454, 484, 485, 497, 498, 911

[56] References Cited

U.S. PATENT DOCUMENTS

| | | | |
|---|---|---|---|
| 2,256,047 | 9/1941 | Dietert | 106/68 X |
| 2,261,260 | 11/1941 | Kraus | 106/84 |
| 2,277,286 | 3/1942 | Bechtner | 52/169.14 X |
| 2,856,301 | 10/1958 | Badger et al. | 106/33 |
| 3,186,896 | 6/1965 | Clem | 428/182 |
| 3,949,560 | 4/1976 | Clem | 405/264 |
| 4,021,402 | 5/1977 | Clem | 405/264 X |
| 4,072,019 | 2/1978 | Pearson | 405/264 |
| 4,084,382 | 4/1978 | Clem | 405/264 |
| 4,090,363 | 5/1978 | List et al. | 405/116 |

*Primary Examiner*—Harold Ansher
*Attorney, Agent, or Firm*—Mason, Kolehmainen, Rathburn & Wyss

[57] ABSTRACT

A bentonite composition useful for preventing a flow of water through a structure is disclosed. The composition has substantially all of the bentonite in non-hydrated form by dispersing the bentonite throughout a non-aqueous gel formed from a non-aqueous liquid and a suitable gelling agent for the liquid to form a cohesive mass capable of adhering to a structure while maintaining a desired, cohesive form. The composition can be made into sheets, rods, tubes and the like. For example, the composition can be applied to one side of a water permeable cellulosic fiber containing sheet and the composition side of the sheet secured over an area of potential water flow.

12 Claims, No Drawings

BENTONITE-GELLED OIL WATERPROOFING COMPOSITION

FIELD OF THE INVENTION

The present invention relates to an improved, gelled bentonite composition having a modeling clay-like consistency while retaining substantially all of the bentonite in an unswelled condition for preventing the seepage of water through structures. In particular, the present invention relates to a gelled bentonite composition containing a high swelling bentonite clay, an organic liquid, and a gelling agent for the organic liquid to provide a formable and shapable non-aqueous bentonite clay gel capable of being inserted into a desired location, and shaped as desired to block the potential flow of water through a path of possible seepage while retaining substantially 100% of the bentonite in a non-hydrated or non-gelled form.

PRIOR ART

It is already known to provide seepage resistant structures by employing a mass of swellable bentonite across the path of possible seepage or flow. One such method and composition for impeding the seepage or flow of water is disclosed in U.S. Pat. No. 2,277,286, granted Mar. 24, 1942, to Paul Bechtner, and assigned to the same assignee as the present invention. As therein more fully described, commercial bentonite is used to block leakage or flow of water seepage, and structures of various types are safeguarded against leakage by blocking the path of flow of the water with bentonitic or highly colloidal clay which possess the capacity to swell and gelatinize upon contact with water. One of the clays found best suited for this purpose was the true bentonite obtained in regions of Wyoming and South Dakota, although other highly colloidal, or bentonitic clays which possess the property of swelling and gelatinizing in water to a substantial degree are also useful. These same clays are also useful in accordance with the present invention.

In accordance with one embodiment of the Bechtner U.S. Pat. No. 2,277,286, a stiff putty-like mass is formed by adding to the bentonite from 1 to 1½ times as much water. The resulting putty-like mass, having a portion of its bentonite in a hydrated or swelled condition, forms a mass which is sufficiently cohesive as a result of the partial swelling of the bentonite to adhere to surfaces, so long as the mass remains moist, while retaining about 70-80% of its potential absorbant and swelling property. This embodiment disclosed in the Bechtner patent eliminates the construction of expensive and complicated forms, however, 20 to 30% of the bentonite clay in the putty-like mass is rendered ineffective by the necessary pre-swelling as a result of its initial hydration to achieve a cohesive mass and, further, once wetted, the mass must be maintained moist to achieve the desired cohesiveness. In accordance with the present invention, these drawbacks are eliminated while achieving a gelled, bentonite composition having a putty-like consistency which maintains its cohesiveness over extended periods of time while in contact with air without pre-hydrating any of the bentonite contained therein.

SUMMARY OF THE INVENTION

An object of the present invention is to provide a no-aqueous, gelled bentonite composition capable of being adhered to a structure at a desired location in a desired quantity to prevent the seepage of water through the structure.

Another object of the present invention is to provide a non-aqueous, gelled bentonite composition which maintains its cohesiveness without expensive, surrounding forms while maintaining the bentonite in substantially non-hydrated, non-swelled form.

Another object of the present invention is to provide a non-aqueous, gelled bentonite composition comprising a swellable bentonite clay, a non-aqueous liquid, and a gelling agent capable of providing a cohesive mass when the non-aqueous liquid, gelling agent, and bentonite clay are combined.

Another object of the present invention is to provide a non-aqueous, gelled bentonite composition having a cohesive, putty-like consistency capable of being deformed, bent, packed into cavities, and rolled into coils.

Another object of the present invention is to provide a non-aqueous, gelled bentonite composition wherein the bentonite is substantially 100% non-hydrated by providing a non-aqueous liquid, a gelling agent for said non-aqueous liquid, and sufficient non-swelled bentonite admixed with the gelled liquid to provide a cohesive paste.

Another object of the present invention is to provide a non-aqueous, gelled, substantially non-hydrated bentonite composition capable of being adhered over cracks in concrete foundations to seal the foundation crack when the bentonite composition is contacted with water.

Another object of the present invention is to provide a non-aqueous, gelled bentonite composition useful for preventing seepage of water through expansion joints in structures, such as cement foundations.

Another object of the present invention is to provide a non-aqueous, gelled bentonite composition capable of being shaped as a sheet, rod, tube, or the like, suitable for a particular use.

These and other objects and advantages of the present invention will become readily apparent from the following detailed description of the present invention.

DETAILED DESCRIPTION OF THE PREFERRED EMBODIMENTS

The non-aqueous, gelled bentonite composition of the present invention includes a high swelling Wyoming bentonite clay, a non-aqueous liquid, and a gelling agent for the non-aqueous liquid. Sufficient gelling agent is added to the non-aqueous liquid to form a gel. High swelling bentonite clay, preferably in fine powder form, for example 210 to 20 microns, is then added to the gel in a suitable quantity to provide a cohesive, paste-like consistency capable of being formed into a desired shape, without wetting the bentonite. Generally, the non-aqueous liquid will comprise about 40-85% by weight of the liquid-gelling agent combination and the gelling agent is added in an amount in the range of about 15-60% by weight of the liquid-gelling agent combination. The non-aqueous liquid and the gelling agent can be added in a weight ratio of 1:4 to 4:1 provided that a cohesive mass is maintained. The bentonite clay is combined into the composition preferably by adding the clay to the gelled liquid in an amount sufficient to form a cohesive mass, generally in an amount in the range of 25% to 75% by weight of the total bentonite composition, and can be in the range of 20%-75% by weight. There is no criticality to the order of addition except for convenience in determining amounts of gelling agent and bentonite to achieve a particular paste-like consistency. The composition can be mixed vigorously to form a substantially homogeneous dispersion.

Suitable non-aqueous liquids include any of the organics capable of gellation by any suitable gelling agent. For example lubricating oil; mineral oil; mineral spirits; naphtha; kerosene; microcrystalline wax; linseed oil; aromatic liquids such as xylol; toluol; denatured ethanol; trichlorethylene; solvents such as n-butyl alcohol; methylisobutyl ketone; n-butyl acetate; toluene, and the like. The more viscous non-aqueous liquids are preferred so that a lesser amount of gelling agent is required to provide a gel of good cohesiveness such that less bentonite is required to provide a cohesive mass.

Suitable gelling agents for the above organic liquids include paraffin wax; aluminum stearate; calcium stearate; lithium stearate; sodium N-octadecylterephthalamate; N-Cocogamma-hydroxybutyramide; any of the oil thickening agents such as the CARBOPOL resins; aluminum octoate together with a lower alcohol such as methanol or isopropanol; magnesium silicate such as AVIBEST-C containing 37% by weight MgO 43% by weight $SiO_2$ 4% by weight $Fe_2O_3$ hydrated with 12% water at 700° C., ATTAGEL 50 having the following chemical composition:

| | |
|---|---|
| Silicon ($SiO_2$) | 68.0% |
| Aluminum ($Al_2O_3$) | 12.0% |
| Magnesium (MgO) | 10.5% |
| Iron ($Fe_2O_3$) | 5.0% |
| Calcium (CaO) | 1.7% |
| Phosphorous ($P_2O_5$) | 1.0% |
| Potassium ($K_2O$) | 1.0% |
| Titanium ($TiO_2$) | 0.7% |
| Others | 0.1% | dimethyldioctadecyl ammonium bentonite (BENTONE), or any other gelling agent known to gel and thicken an organic (non-aqueous) liquid.

The cohesive mass of bentonite composition can be used quite effectively in concrete construction work. A concrete foundation is generally poured in segments—the size of a segment depending upon the volume of concrete capable of being poured in one working day. As two segments join they have a condition called a "cold joint" in which a hairline crack exists between the original concrete and the freshly poured concrete. A water stop is commonly used to prevent the flow of water through the cold joint, but water stops have been found to be highly unreliable, sometimes bending as a result of the concrete pressure, leaving a poor seal. The composition of the present invention is adapted to be disposed over such "cold joints" in concrete by pressing the composition against the concrete wall to cover the joint between concrete segments. In one embodiment, a slot or channel can be formed on an outer surface of the concrete where the two segments join to form a well defined area to be filled with the composition. The slot is not necessary however, since the gelled composition described herein will stick to a flat concrete surface.

In another embodiment, the composition of the present invention can be applied over one major surface of a water permeable support sheet such as a corrugated paperboard sheet, in a desired size to form an open-faced panel and the open-faced side of the sheet can be pressed against a structure to secure the panel in place to be over a water flow path.

EXAMPLES

Example 1

Into warm mineral oil (200° F.) is added 25% by total weight paraffin wax and the oil-wax mixture is stirred vigorously until it forms into a gel. Pulverized, high swelling bentonite clay is added to the gel in an amount of 67% by total weight of the gel-bentonite composition to form a mastic, or a paste.

Example 2

Into warm mineral oil (175° F.) is added 50% by total weight paraffin wax and the oil-wax mixture is stirred vigorously until it forms into a gel. Pulverized, high-swelling Wyoming bentonite clay is added to the gel in an amount of 53% by total weight of the gel-bentonite composition to form a mastic or a paste. The composition can be maintained warm to make a less viscous composition or can be cooled to room temperature to develop structural rigidity.

The gelled compositions of the present invention contain no water, thus none of the bentonite has been expanded. The composition can be forced into cracks on the interior or exterior of a leaking structure when formed into bars, rods, tubes, and the like. On contact with water, the bentonite begins to expand when potential water leakage contacts the composition and seals off further water leakage. The composition of the present invention can be used to cover wide areas of leakage such as on sponge type concrete. The composition can be warmed to reduce its viscosity, poured over a backing material, such as a single face corrugated board, or a paper board sheet with the open side pressed into position.

I claim:

1. A water-impervious panel comprising means for supporting a gelled bentonite composition in sheet form said means having a non-aqueous gelled bentonite composition applied to one side thereof, said non-aqueous bentonite composition comprising water swellable, non-hydrated bentonite, a non-aqueous liquid, and a gelling agent for said non-aqueous liquid mixed to form a mass capable of adhering to said composition support means in cohesive form.

2. A panel as defined in claim 1 wherein said support means comprises a water-permeable cellulosic fiber-containing sheet.

3. A panel as defined in claim 1 wherein said non-aqueous liquid comprises 40–85% based on the total weight of the non-aqueous liquid plus gelling agent, wherein said gelling agent comprises 15–60% based on the total weight of the non-aqueous liquid plus gelling agent, and wherein said bentonite is included within the gelled composition in an amount sufficient to provide an effective water seal to prevent the passage of water through the panel when said bentonite is hydrated.

4. A panel as defined in claim 1 wherein said bentonite and said gelling agent are present in an amount sufficient to form a self cohesive, pasty mass.

5. A panel as defined in claim 1 wherein said bentonite comprises 20% to 75% by weight of the total gelled bentonite composition.

6. A panel as defined in claim 1 wherein said non-aqueous liquid and said gelling agent are present in said gelled bentonite composition in a weight ratio of 1:4 to 4:1.

7. A panel as defined in claim 1 wherein said bentonite is powdered to a size in the range of 210 to 20 microns.

8. A panel as defined in claim 1 wherein said gelled bentonite composition is a substantially homogeneous dispersion.

9. A panel as defined in claim 1 wherein said non-aqueous liquid is an oil and wherein said gelling agent is paraffin wax.

10. A panel as defined in claim 9 wherein said paraffin wax is included within the gelled bentonite composition in an amount in the range of about 25-50% by weight of oil plus paraffin wax.

11. A panel as defined in claim 9 wherein said oil is a lubricating oil.

12. A panel as defined in claim 9 wherein said oil is mineral oil.

* * * * *